US012417730B2

(12) United States Patent
Lee et al.

(10) Patent No.: US 12,417,730 B2
(45) Date of Patent: Sep. 16, 2025

(54) DISPLAY DEVICE AND DRIVER

(71) Applicant: Samsung Display Co., Ltd., Yongin-si (KR)

(72) Inventors: Donggyu Lee, Yongin-si (KR); Sehyuk Park, Seongnam-si (KR); Youngha Sohn, Seongnam-si (KR); Jin-Wook Yang, Suwon-si (KR); Jae-Hyeon Jeon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 162 days.

(21) Appl. No.: 18/106,704

(22) Filed: Feb. 7, 2023

(65) Prior Publication Data

US 2024/0013709 A1 Jan. 11, 2024

(30) Foreign Application Priority Data

Jul. 5, 2022 (KR) ........................ 10-2022-0082667

(51) Int. Cl.
*G09G 3/32* (2016.01)

(52) U.S. Cl.
CPC ....... *G09G 3/32* (2013.01); *G09G 2310/0267* (2013.01); *G09G 2310/061* (2013.01); *G09G 2310/08* (2013.01); *G09G 2320/0233* (2013.01)

(58) Field of Classification Search
CPC ..... G09G 2310/0267; G09G 2310/061; G09G 2310/08; G09G 2320/0233; G09G 3/32;
(Continued)

(56) References Cited

U.S. PATENT DOCUMENTS 11,295,673 B2 * 4/2022 Park ..................... G09G 3/3275
2021/0043132 A1 * 2/2021 Nam ........................ G09G 3/32
(Continued)

FOREIGN PATENT DOCUMENTS

EP 3460789 A1 * 3/2019 ............. G09G 3/035
EP 3822961 A1 * 5/2021 ........... G09G 3/3233
(Continued)

*Primary Examiner* — Ricardo Osorio
(74) *Attorney, Agent, or Firm* — CANTOR COLBURN LLP

(57) ABSTRACT

A display device includes a display panel which includes first to $n^{th}$ pixel areas arranged in a direction, where n is a natural number greater than or equal to 2, an emission control driver which provides an emission control signal having a plurality of emission cycles corresponding to a number of outputs of a gate-on voltage during a frame period to the first to $n^{th}$ pixel areas, a power supply which generates first to $n^{th}$ bias voltages respectively provided to the first to $n^{th}$ pixel areas, and a timing controller which controls timings when the first to $n^{th}$ bias voltages are supplied to the first to $n^{th}$ pixel areas in a way such that a $k^{th}$ bias voltage is provided with a delay of one emission cycle from a $(k-1)^{th}$ bias voltage, where k is a natural number greater than or equal 2 and less than or equal n.

18 Claims, 12 Drawing Sheets

(58) Field of Classification Search

CPC ... G09G 2300/0819; G09G 2300/0842; G09G 2300/0852; G09G 2300/0861; G09G 2310/0245; G09G 2310/0251; G09G 3/3233; G09G 2300/0809; G09G 2330/028

See application file for complete search history.

(56) References Cited

U.S. PATENT DOCUMENTS

| | | | | |
|---|---|---|---|---|
| 2021/0134210 | A1* | 5/2021 | In | G09G 3/2092 |
| 2021/0193020 | A1* | 6/2021 | Ka | G09G 3/3266 |

FOREIGN PATENT DOCUMENTS

| | | | | | |
|---|---|---|---|---|---|
| KR | 1020200134387 | A | | 12/2020 | |
| KR | 1020210046910 | A | | 4/2021 | |
| KR | 1020210054114 | A | | 5/2021 | |
| KR | 20220014366 | A | * | 2/2022 | |
| KR | 20220041509 | A | * | 4/2022 | |
| KR | 102425574 | B1 | * | 7/2022 | |
| KR | 102657981 | B1 | * | 4/2024 | |
| WO | WO-2022070386 | A1 | * | 4/2022 | G09G 3/3233 |

* cited by examiner

DISPLAY DEVICE AND DRIVER

This application claims priority to Korean Patent Application No. 10-2022-0082667, filed on Jul. 5, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and a driver included in the display device.

2. Description of the Related Art

A display device may include a display panel including a plurality of pixels and a gate driver for providing gate signals to the pixels. The display panel may be driven in a variable frequency method in which a driving frequency of the display panel is changed.

In a low frequency driving, since one frame period increases, a leakage current of the pixel may increase. Accordingly, a bias voltage may be applied to the pixel in response to the gate signal to compensate the leakage current of the pixel. Accordingly, a luminance deviation may occur between pixel areas of the display panel.

SUMMARY

In a display device where a bias voltage is applied to pixels in response to gate signals to compensate the leakage current of the pixels, the gate signals provided to the pixels are sequentially shifted for each pixel row, such that timings when the bias voltage is applied to the pixels may be different from each other. Accordingly, a luminance deviation may occur between pixel areas of the display panel.

Embodiments provide a driver for improving a luminance deviation between a plurality of pixel areas of a display panel in a low frequency driving and a display device including the driver.

A display device according to embodiments includes a display panel which includes first to $n^{th}$ pixel areas arranged in a direction, where n is a natural number greater than or equal to 2, an emission control driver which provides an emission control signal having a plurality of emission cycles corresponding to the number of outputs of a gate-on voltage during a frame period to the first to $n^{th}$ pixel areas, a power supply which generates first to $n^{th}$ bias voltages respectively provided to the first to $n^{th}$ pixel areas, and a timing controller which controls timings when the first to $n^{th}$ bias voltages are supplied to the first to $n^{th}$ pixel areas in a way such that a $k^{th}$ bias voltage is provided with a delay of one emission cycle from a $(k-1)^{th}$ bias voltage, where k is a natural number greater than or equal 2 and less than or equal n.

In an embodiment, the frame period may include an active period and a blank period following the active period, and the number of the emission cycles included in the active period may be n.

In an embodiment, a level of each of the first to $n^{th}$ bias voltages may be step-wisely changed in the blank period.

In an embodiment, the level of each of the first to $n^{th}$ bias voltages may be step-wisely changed for the emission cycle within the blank period.

In an embodiment, the level of each of the first to $n^{th}$ bias voltages may step-wisely increase in the blank period.

In an embodiment, the number of the emission cycles included in the blank period may increase as a driving frequency of the display panel decreases.

In an embodiment, a level of each of the first to $n^{th}$ bias voltages may be constant in the active period.

In an embodiment, a level of the $k^{th}$ bias voltage may be equal to a level of the $(k-1)^{th}$ bias voltage.

In an embodiment, a level of the $k^{th}$ bias voltage may be different from a level of the $(k-1)^{th}$ bias voltage.

In an embodiment, the level of the $k^{th}$ bias voltage may be equal to a sum of a level of the first bias voltage and an offset level.

In an embodiment, the power supply may be closest to the first pixel area among the first to $n^{th}$ pixel areas, and the offset level may be greater than 0.

In an embodiment, the display device may further include a gate driver which provides a bias gate signal having a frequency equal to a frequency of the emission control signal to the first to $n^{th}$ pixel areas.

In an embodiment, each of the first to $n^{th}$ pixel areas may include a plurality of pixels. Each of the pixels may include a light emitting diode, a driving transistor which provides a driving current to the light emitting diode, and a bias transistor which provides a corresponding bias voltage among the first to $n^{th}$ bias voltages to a source electrode or a drain electrode of the driving transistor in response to the bias gate signal.

In a driver according to embodiments for driving a display panel including first to $n^{th}$ pixel areas arranged in a direction, where an emission control signal having a plurality of emission cycles corresponding to the number of outputs of a gate-on voltage during a frame period is provided to the first to $n^{th}$ pixel areas, and first to $n^{th}$ bias voltages are respectively provided to the first to $n^{th}$ pixel areas, where n is a natural number greater than or equal to 2, the driver controls timings when the first to $n^{th}$ bias voltages are supplied to the first to $n^{th}$ pixel areas in a way such that a $k^{th}$ bias voltage is provided with a delay of one emission cycle from a $(k-1)^{th}$ bias voltage, where k is a natural number greater than or equal 2 and less than or equal n.

In an embodiment, the driver may include a power supply which generates the first to $n^{th}$ bias voltages, and a timing controller which controls the timings when the first to $n^{th}$ bias voltages are supplied to the first to $n^{th}$ pixel areas in a way such that the $k^{th}$ bias voltage is provided with the delay of one emission cycle from the $(k-1)^{th}$ bias voltage.

In an embodiment, the frame period may include an active period and a blank period following the active period, and the number of the emission cycles included in the active period may be n.

In an embodiment, a level of each of the first to $n^{th}$ bias voltages may be step-wisely changed in the blank period.

In an embodiment, the level of each of the first to $n^{th}$ bias voltages may be step-wisely changed for the emission cycle within the blank period.

In an embodiment, a level of the $k^{th}$ bias voltage may be equal to a level of the $(k-1)^{th}$ bias voltage.

In an embodiment, a level of the $k^{th}$ bias voltage may be different from a level of the $(k-1)^{th}$ bias voltage.

In the display device and the driver according to embodiments, the first to $n^{th}$ bias voltages, which are respectively provided to the first to $n^{th}$ pixel areas, may be generated, and the timings when the first to $n^{th}$ bias voltages are supplied to the first to $n^{th}$ pixel areas may be controlled in a way such that the $k^{th}$ bias voltage is provided with the delay of one emission cycle from the $(k-1)^{th}$ bias voltage, to allow the bias voltage of an appropriate level to be applied to each of the first to $n^{th}$ pixel areas. Accordingly, a luminance deviation between the first to $n^{th}$ pixel areas of the display panel in a low frequency driving may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
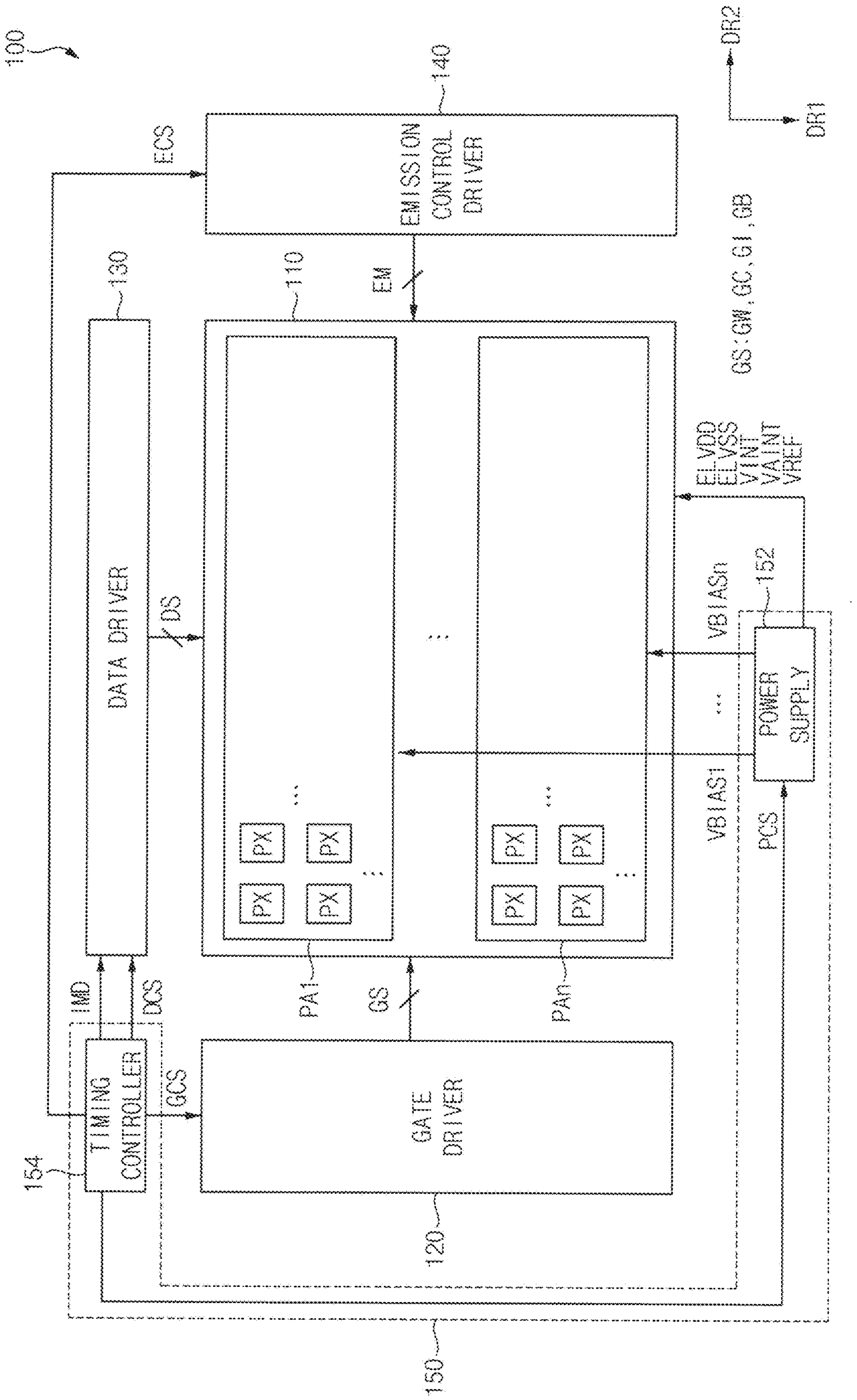
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device and a driver according to embodiments of the disclosure will be described in more detail with reference to the accompanying drawings.

FIG. 1 is a block diagram illustrating a display device 100 according to an embodiment.

Referring to FIG. 1, an embodiment of a display device 100 may include a display panel 110, a gate driver 120, a data driver 130, an emission control driver 140, and a controller (or a driver) 150.

The display panel 110 may include a plurality of pixels PX. In an embodiment, the plurality of pixels PX may include red pixels that emit red light, green pixels that emit green light, and blue pixels that emit blue light. A plurality of pixel rows and a plurality of pixel columns may be defined by the pixels PX, that is, the pixels PX may be arranged substantially in a matrix form.

The display panel 110 may include first to $n^{th}$ pixel areas PA1 to PAn (n is a natural number greater than or equal to 2) arranged in one direction. In an embodiment, for example, the first to $n^{th}$ pixel areas PA1 to PAn may be arranged in a pixel column direction DR1, and each of the first to $n^{th}$ pixel areas PA1 to PAn may extend in a pixel row direction DR2. Each of the first to $n^{th}$ pixel areas PA1 to PAn may include some pixels among the plurality of pixels PX.

The gate driver 120 may provide a gate signal GS to each of the pixels PX disposed in the first to $n^{th}$ pixel areas PA1 to PAn. A gate signal GS, which is shifted from a gate signal GS provided to an $m^{th}$ pixel row by one horizontal time, may be provided to an $(m+1)^{th}$ pixel row (m is a natural number greater than or equal to 1). The gate signal GS may include a write gate signal GW, a compensation gate signal GC, an initialization gate signal GI, and a bias gate signal GB. A frequency of the write gate signal GW, a frequency of the compensation gate signal GC, and a frequency of the initialization gate signal GI may be the same as each other. The bias gate signal GB may have a frequency higher than the frequency of the write gate signal GW, the frequency of the compensation gate signal GC, and the frequency of the initialization gate signal GI. The gate driver 120 may generate the gate signal GS based on a first control signal GCS. The first control signal GCS may include a gate start signal, a gate clock signal, or the like.

The data driver 130 may provide a data signal DS to each of the pixels PX disposed in the first to $n^{th}$ pixel areas PA1 to PAn. The data driver 130 may generate the data signal DS based on image data IMD and a second control signal DCS. The image data IMD may include grayscale values corresponding to the pixels PX. The second control signal DCS may include a data start signal, a data clock signal, or the like.

The emission control driver 140 may provide an emission control signal EM to each of the pixels PX disposed in the first to $n^{th}$ pixel areas PA1 to PAn. An emission control signal EM, which is shifted from an emission control signal EM provided to the $m^{th}$ pixel row by one horizontal time, may be provided to the $(m+1)^{th}$ pixel row. The emission control signal EM may have the same frequency as the frequency of the bias gate signal GB. The emission control driver 140 may generate the emission control signal EM based on a third control signal ECS. The third control signal ECS may include an emission control start signal, an emission control clock signal, or the like.

The controller 150 may include a power supply 152 and a timing controller 154. The power supply 152 may provide a driving voltage ELVDD, a common voltage ELVSS, a first initialization voltage VINT, a second initialization voltage VAINT, and a reference voltage VREF to the first to $n^{th}$ pixel areas PA1 to PAn. Further, the power supply 152 may provide first to $n^{th}$ bias voltages VBIAS1 to VBIASn to the first to $n^{th}$ pixel areas PA1 to PAn, respectively. In such an embodiment, the power supply 152 may provide the first bias voltage VBIAS1 to the first pixel area PA1, and may provide the $n^{th}$ bias voltage VBIASn to the $n^{th}$ pixel area PAn. The power supply 152 may generate the driving voltage ELVDD, the common voltage ELVSS, the first initialization voltage VINT, the second initialization voltage VAINT, the reference voltage VREF, and the first to $n^{th}$ bias voltages VBIAS1 to VBIASn based on a fourth control signal PCS.

The timing controller 154 may control the operation of the gate driver 120, the operation of the data driver 130, the operation of the emission control driver 140, and the operation of the power supply 152. The timing controller 154 may generate the image data IMD, the first control signal GCS, the second control signal DCS, the third control signal ECS, and the fourth control signal PCS based on an image signal and a control signal receiving from the outside.

Figure 2:
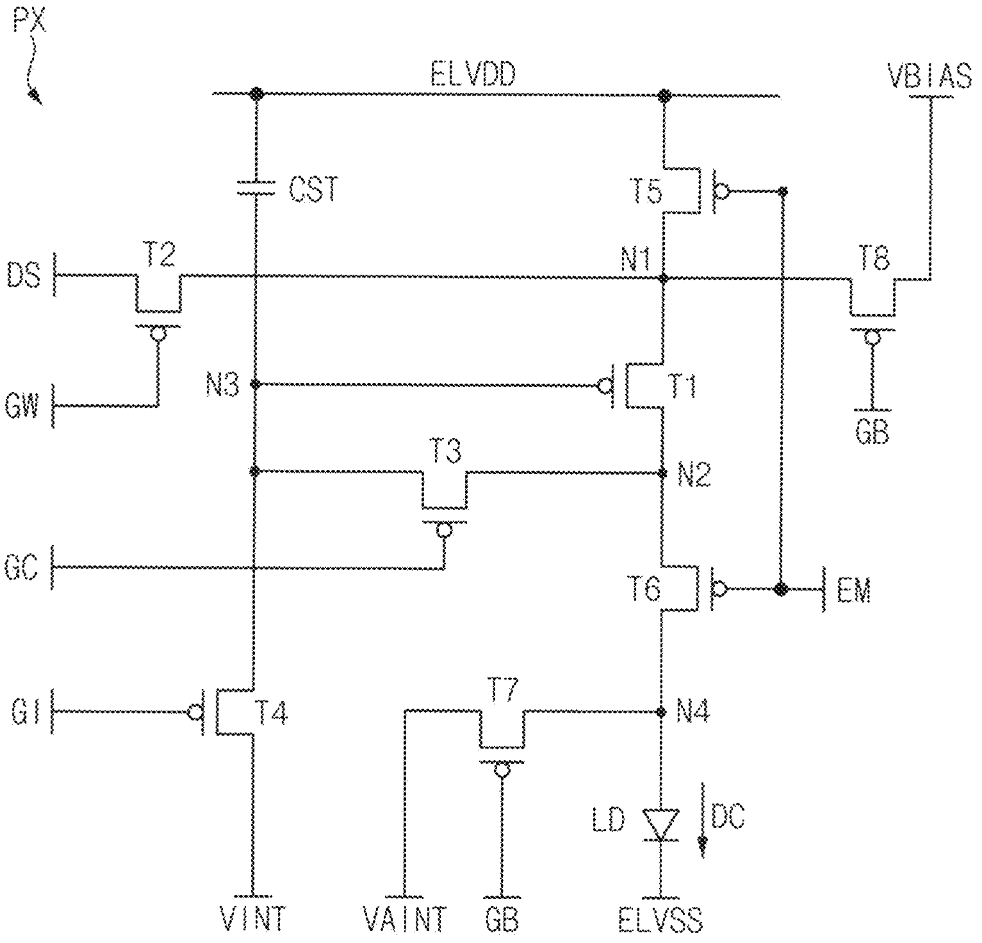
FIG. 2 is a circuit diagram illustrating a pixel according to an embodiment.

FIG. 2 is a circuit diagram illustrating a pixel PX according to an embodiment.

Referring to FIG. 2, an embodiment of a pixel PX may include a plurality of transistor, at least one capacitor, and a light emitting diode LD. The plurality of transistors may include a first transistor T1, a second transistor T2, a third transistor T3, a fourth transistor T4, a fifth transistor T5, a sixth transistor T6, a seventh transistor T7, and an eighth transistor T8, and the at least one capacitor may include a storage capacitor CST.

A source electrode of the first transistor T1 may be connected to a first node N1, and a drain electrode of the first transistor T1 may be connected to a second node N2. A gate electrode of the first transistor T1 may be connected to a third node N3. The first transistor T1 may generate a driving current DC based on a voltage between the third node N3 and the first node N1. The first transistor T1 may be referred to as a driving transistor.

A source electrode of the second transistor T2 may be connected to a data line that transmits the data signal DS, and a drain electrode of the second transistor T2 may be connected to the first node N1. A gate electrode of the second transistor T2 may be connected to a write gate line that transmits the write gate signal GW. The second transistor T2 may write the data signal DS to the first node N1 in response to the write gate signal GW.

A source electrode of the third transistor T3 may be connected to the second node N2, and a drain electrode of the third transistor T3 may be connected to the third node N3. A gate electrode of the third transistor T3 may be connected to a compensation gate line that transmits the compensation gate signal GC. The third transistor T3 may diode-connect the drain electrode and the gate electrode of the first transistor T1 in response to the compensation gate signal GC.

A source electrode of the fourth transistor T4 may be connected to a first initialization voltage line that transmits the first initialization voltage VINT, and a drain electrode of the fourth transistor T4 may be connected to the third node N3. A gate electrode of the fourth transistor T4 may be connected to an initialization gate line that transmits the initialization gate signal GI. The fourth transistor T4 may initialize the third node N3 with the first initialization voltage VINT in response to the initialization gate signal GI.

A source electrode of the fifth transistor T5 may be connected to a driving voltage line that transmits the driving voltage ELVDD, and a drain electrode of the fifth transistor T5 may be connected to the first node N1. A gate electrode of the fifth transistor T5 may be connected to an emission control line that transmits the emission control signal EM.

The fifth transistor T5 may electrically connect the driving voltage line to the first node N1 in response to the emission control signal EM.

A source electrode of the sixth transistor T6 may be connected to the second node N2, and a drain electrode of the sixth transistor T6 may be connected to a fourth node N4. A gate electrode of the sixth transistor T6 may be connected to the emission control line. The sixth transistor T6 may electrically connect the second node N2 to the fourth node N4 in response to the emission control signal EM.

A source electrode of the seventh transistor T7 may be connected to a second initialization voltage line that transmits the second initialization voltage VAINT, and a drain electrode of the seventh transistor T7 may be connected to the fourth node N4. A gate electrode of the seventh transistor T7 may be connected to a bias gate line that transmits the bias gate signal GB. The seventh transistor T7 may initialize the fourth node N4 with the second initialization voltage VAINT in response to the bias gate signal GB.

A source electrode of the eighth transistor T8 may be connected to a bias voltage line that transmits the bias voltage VBIAS, and a drain electrode of the eighth transistor T8 may be connected to the first node N1 or the second node N2. A gate electrode of the eighth transistor T8 may be connected to the bias gate line. The eighth transistor T8 may on-bias the first transistor T1 with the bias voltage VBIAS in response to the bias gate signal GB. The eighth transistor T8 may be referred to as a bias transistor.

In an embodiment, each of the first transistor T1, the second transistor T2, the third transistor T3, the fourth transistor T4, the fifth transistor T5, the sixth transistor T6, the seventh transistor T7, and the eighth transistor T8 may be a P-type transistor (e.g., a P-type metal-oxide-semiconductor ("PMOS") transistor). In an alternative embodiment, at least one selected from the first transistor T1, the second transistor T2, the third transistor T3, the fourth transistor T4, the fifth transistor T5, the sixth transistor T6, the seventh transistor T7, and the eighth transistor T8 may be an N-type transistor (e.g., an N-type metal-oxide-semiconductor ("NMOS") transistor).

A first electrode of the storage capacitor CST may be connected to the third node N3, and a second electrode of the storage capacitor CST may be connected to the driving voltage line that transmits the driving voltage ELVDD. The storage capacitor CST may store the voltage of the third node N3.

A first electrode of the light emitting diode LD may be connected to the fourth node N4, and a second electrode of the light emitting diode LD may be connected to a common voltage line that transmits the common voltage ELVSS. The light emitting diode LD may emit light based on the driving current DC. The light emitting diode LD may emit light having a luminance corresponding to the driving current DC.

Figure 3:
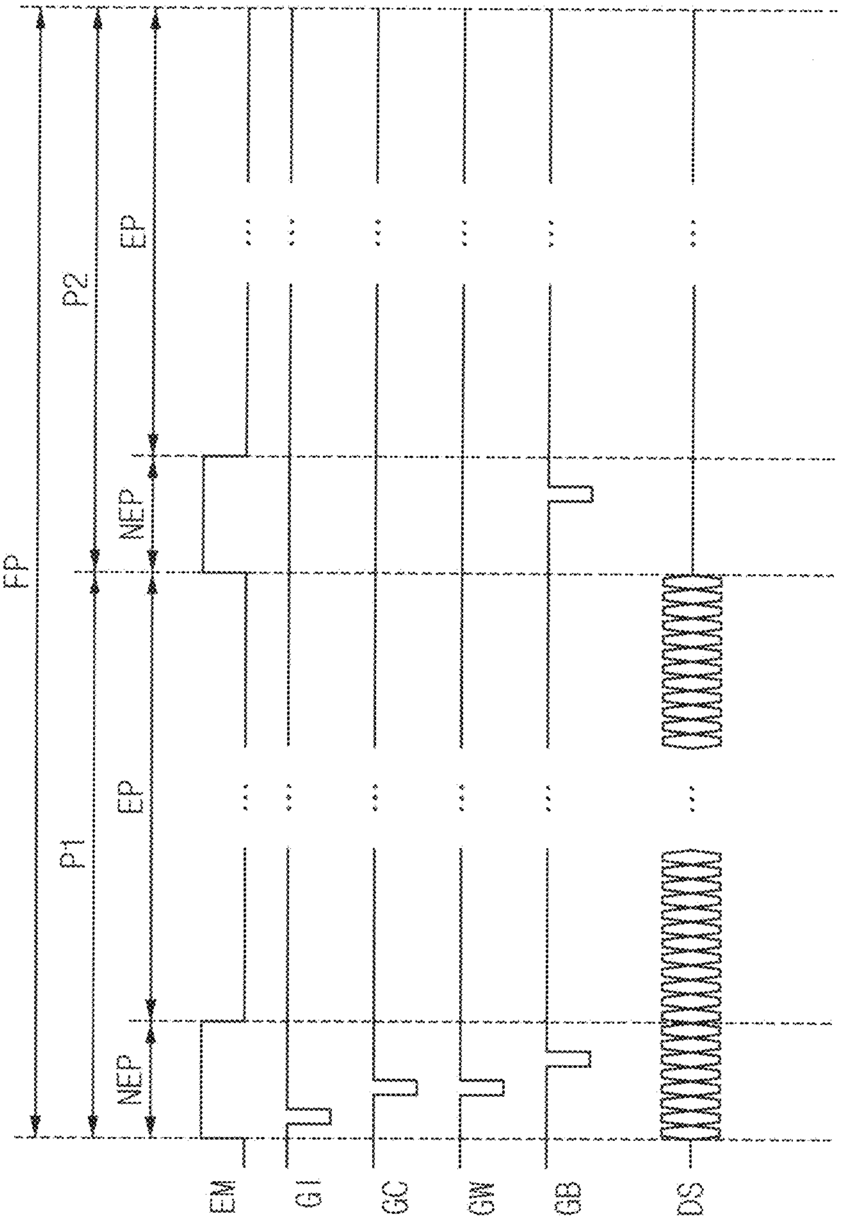
FIG. 3 is a signal timing diagram for describing an operation of the pixel in FIG. 2.

FIG. 3 is a signal timing diagram for describing an operation of the pixel PX in FIG. 2.

Referring to FIG. 3, one frame period FP may include one first period P1 and at least one second period P2. The first period P1 may be a data writing period in which the data signal DS is written in the pixel PX, and the second period P2 may be a data holding period in which the data signal DS written in the pixel PX is maintained. As the driving frequency of the display panel 110 decreases, the number of the second periods P2 included in the frame period FP may increase.

Each of the first period P1 and the second period P2 may include a non-emission period NEP and an emission period EP. The non-emission period NEP may be defined as a period in which the emission control signal EM has a gate-off voltage, and the emission period EP may be defined as a period in which the emission control signal EM has a gate-on voltage.

In the non-emission period NEP of the first period P1, the initialization gate signal GI, the compensation gate signal GC, the write gate signal GW, and the bias gate signal GB may be applied to the pixel PX, so that the data signal DS may be written in the storage capacitor CST. In the emission period EP of the first period P1, the light emitting diode LD may emit light based on the driving current DC corresponding to the data signal DS stored in the storage capacitor CST.

In the non-emission period NEP of the second period P2, the bias gate signal GB may be applied to the pixel PX, so that the first transistor T1 may be on-biased. Accordingly, the leakage current generated at the gate electrode of the first transistor T1 may be compensated by the bias voltage VBIAS. In the emission period EP of the second period P2, the light emitting diode LD may emit light based on the driving current DC corresponding to the data signal DS stored in the storage capacitor CST in the first period P1.

Figure 4:
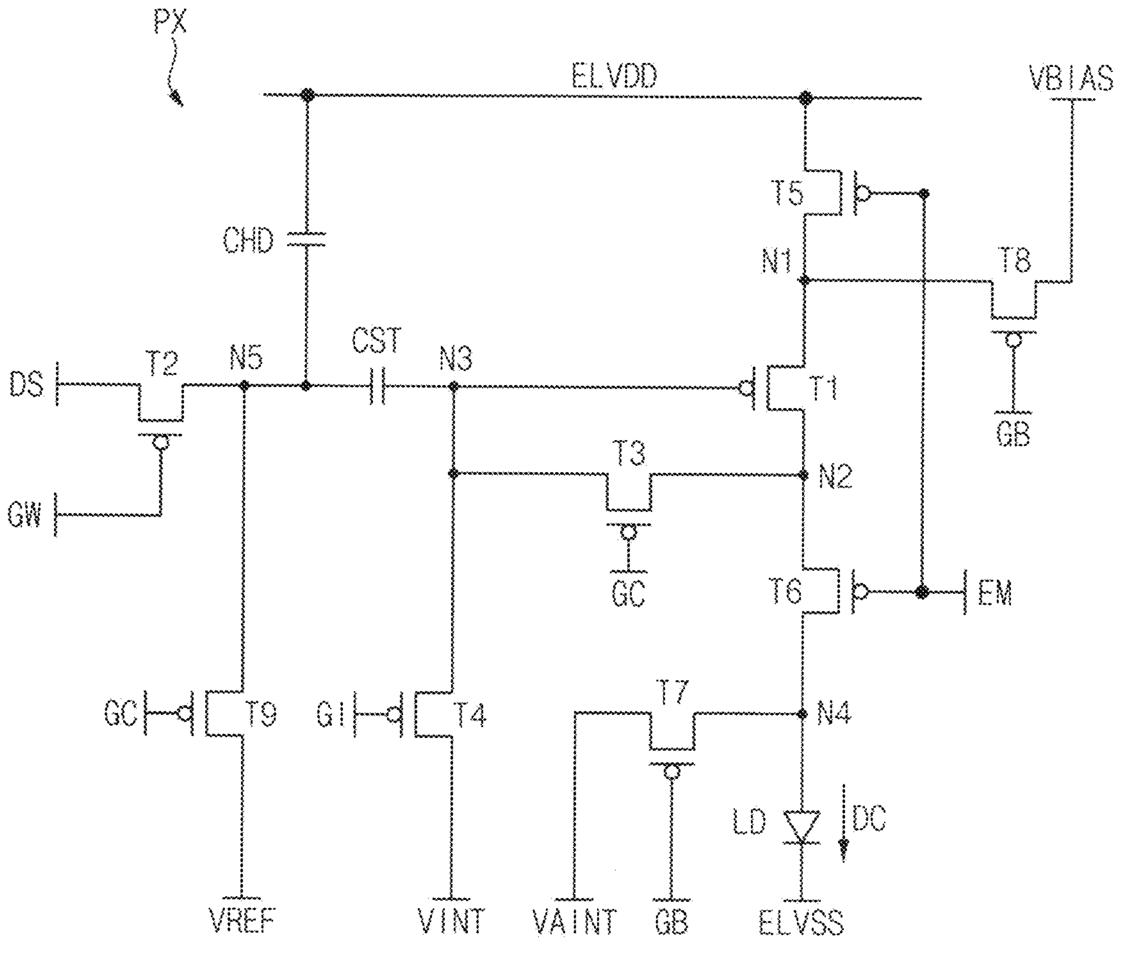
FIG. 4 is a circuit diagram illustrating a pixel according to an alternative embodiment.

FIG. 4 is a circuit diagram illustrating a pixel PX according to an alternative embodiment.

Referring to FIG. 4, an embodiment of a pixel PX may include a plurality of transistors, at least one capacitor, and a light emitting diode LD. In an embodiment, the plurality of transistors may include a first transistor T1, a second transistor T2, a third transistor T3, a fourth transistor T4, a fifth transistor T5, a sixth transistor T6, a seventh transistor T7, an eighth transistor T8, and a ninth transistor T9, and the at least one capacitor may include a storage capacitor CST and a hold capacitor CHD. For convenience of description, any repetitive detailed descriptions of the same or like elements of the pixel PX in FIG. 4 as those of the pixel PX described above with reference to FIG. 2 will be omitted.

In an embodiment, as shown in FIG. 4, a source electrode of the second transistor T2 may be connected to a data line that transmits the data signal DS, and a drain electrode of the second transistor T2 may be connected to a fifth node N5. A gate electrode of the second transistor T2 may be connected to the write gate line. The second transistor T2 may write the data signal DS to the fifth node N5 in response to the write gate signal GW.

A source electrode of the ninth transistor T9 may be connected to a reference voltage line that transmits the reference voltage VREF, and a drain electrode of the ninth transistor T9 may be connected to the fifth node N5. A gate electrode of the ninth transistor T9 may be connected to the compensation gate line. The ninth transistor T9 may apply the reference voltage VREF to the fifth node N5 in response to the compensation gate signal GC.

In an embodiment, each of the first transistor T1, the second transistor T2, the third transistor T3, the fourth transistor T4, the fifth transistor T5, the sixth transistor T6, the seventh transistor T7, the eighth transistor T8, and the ninth transistor T9 may be a P-type transistor (e.g., a PMOS transistor). In an alternative embodiment, at least one of the first transistor T1, the second transistor T2, the third transistor T3, the fourth transistor T4, the fifth transistor T5, the sixth transistor T6, the seventh transistor T7, the eighth transistor T8, and the ninth transistor T9 may be an N-type transistor (e.g., an NMOS transistor).

A first electrode of the storage capacitor CST may be connected to the third node N3, and a second electrode of the storage capacitor CST may be connected to the fifth node N5. The storage capacitor CST may store the voltage of the third node N3.

A first electrode of the hold capacitor CHD may be connected to the fifth node N5, and a second electrode of the hold capacitor CHD may be connected to the driving voltage line. The hold capacitor CHD may store the voltage of the fifth node N5.

Figure 5:
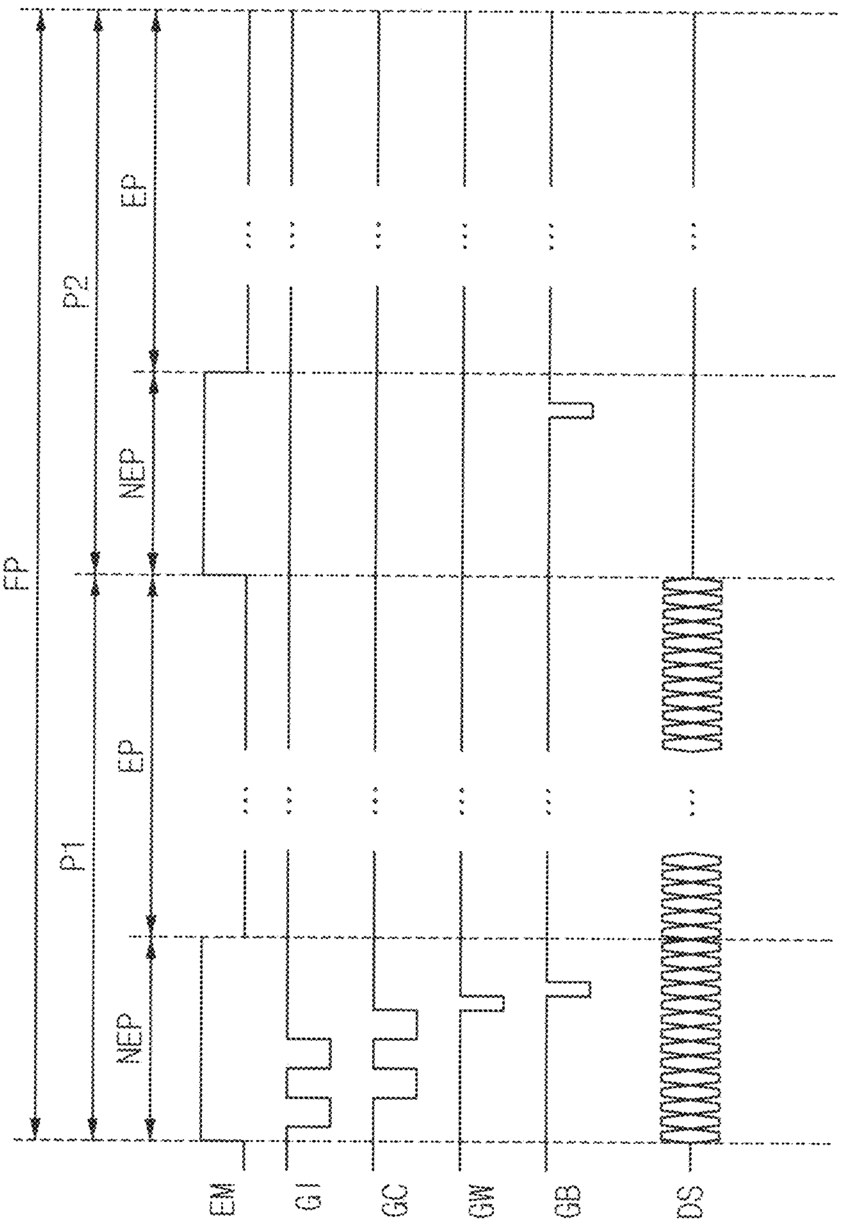
FIG. 5 is a signal timing diagram for describing an operation of the pixel in FIG. 4.

FIG. 5 is a signal timing diagram for describing an operation of the pixel PX in FIG. 4.

For convenience of description, any repetitive detailed descriptions of the same or like operations of the pixel PX shown in FIG. 5 as those of the pixel PX described above with reference to FIG. 3 will be omitted.

Referring to FIG. 5, in the non-emission period NEP of the first period P1, the initialization gate signal GI, the compensation gate signal GC, the write gate signal GW, and the bias gate signal GB may be applied to the pixel PX, so that the data signal DS may be written in the storage capacitor CST. Before the write gate signal GW is applied, the gate-on voltage of the initialization gate signal GI and the gate-on voltage of the compensation gate signal GC may be alternately output a plurality of times. In the emission period EP of the first period P1, the light emitting diode LD may emit light based on the driving current DC corresponding to the data signal DS stored in the storage capacitor CST.

In the non-emission period NEP of the second period P2, the bias gate signal GB may be applied to the pixel PX, so that the first transistor T1 may be on-biased. In the emission period EP of the second period P2, the light emitting diode LD may emit light based on the driving current DC corresponding to the data signal DS stored in the storage capacitor CST in the first period P1.

Figure 6:
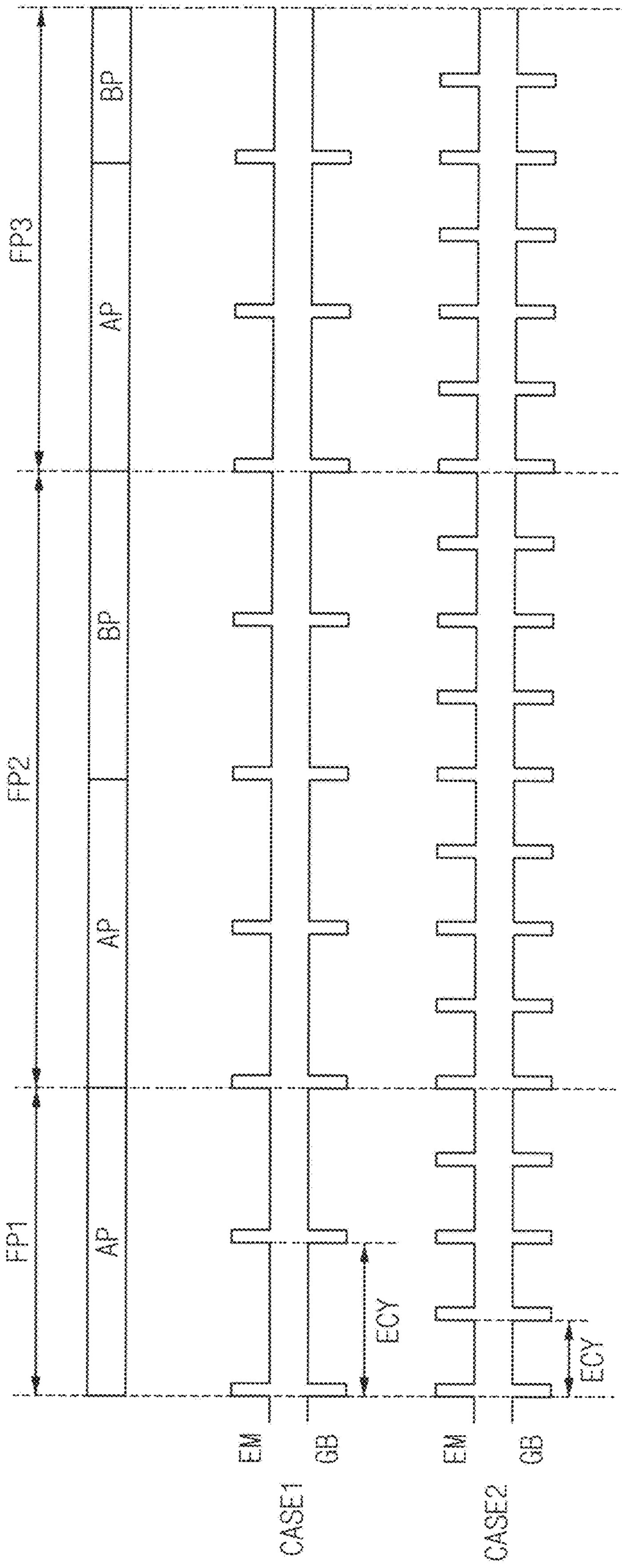
FIG. 6 is a diagram for describing an emission control signal and a bias gate signal according to frame periods.

FIG. 6 is a diagram for describing the emission control signal EM and the bias gate signal GB according to frame periods FP1, FP2, and FP3.

Referring to FIG. 6, the display panel 110 may be driven using a variable refresh rate ("VRR") method in which a driving frequency is changed. In an embodiment, the display panel 110 may be driven at a first frequency in a first frame period FP1, may be driven at a second frequency in a second frame period FP2, and may be driven at a third frequency in a third frame period FP3. In an embodiment, for example, the first frequency may be 240 hertz (Hz), the second frequency may be 120 Hz, and the third frequency may be 160 Hz.

The frame period may include an active period AP and a blank period BP following the active period AP. In an embodiment, the display device 100 may add the blank period BP after the active period AP or increase the blank period BP to decrease the driving frequency of the display panel 110.

The first frame period FP1 may include only the active period AP, and thus, the first frequency may be the maximum driving frequency of the display panel 110. The second frame period FP2 may include the active period AP and the blank period BP, and accordingly, the driving frequency of the display panel 110 may decrease from the first frequency to the second frequency. The blank period BP of the third frame period FP3 may be shorter than the blank period BP of the second frame period FP2, and accordingly, the driving frequency of the display panel 110 may increase from the second frequency to the third frequency.

The frame period may include a plurality of emission cycles ECY. The gate-on voltage of the emission control signal EM may be discontinuously output during one frame period, and the emission control signal EM may have the emission cycles ECY corresponding to the number of outputs of the gate-on voltage. The emission cycles ECY may be defined as a period of a rising edge of the emission control signal EM or a period of a falling edge of the emission control signal EM.

The active period AP may include a plurality of emission cycles ECY. In an embodiment (CASE1), the number of emission cycles ECY included in the active period AP may be two. In an alternative embodiment (CASE2), the number of emission cycles ECY included in the active period AP may be four.

The blank period BP may include at least one emission cycle ECY. The number of emission cycles ECY included in the blank period BP may change based on the increase or decrease of the blank period BP. The number of emission cycles ECY included in the blank period BP may increase as the blank period BP increases, and the number of emission cycles ECY included in the blank period BP may decrease as the blank period BP decreases.

The blank period BP may be changed based on the increase or decrease of the driving frequency of the display panel 110. The blank period BP may decrease as the driving frequency of the display panel 110 increases, and the blank period BP may increase as the driving frequency of the display panel 110 decreases. Accordingly, the number of emission cycles ECY included in the blank period BP may increase as the driving frequency of the display panel 110 decreases, and the number of emission cycles ECY included in the blank period BP may decrease as the driving frequency of the display panel 110 increases.

The bias gate signal GB may have a same frequency as that of the emission control signal EM. The bias gate signal GB may output the gate-on voltage within the non-emission period NEP in which the emission control signal EM has the gate-off voltage.

Figure 7:
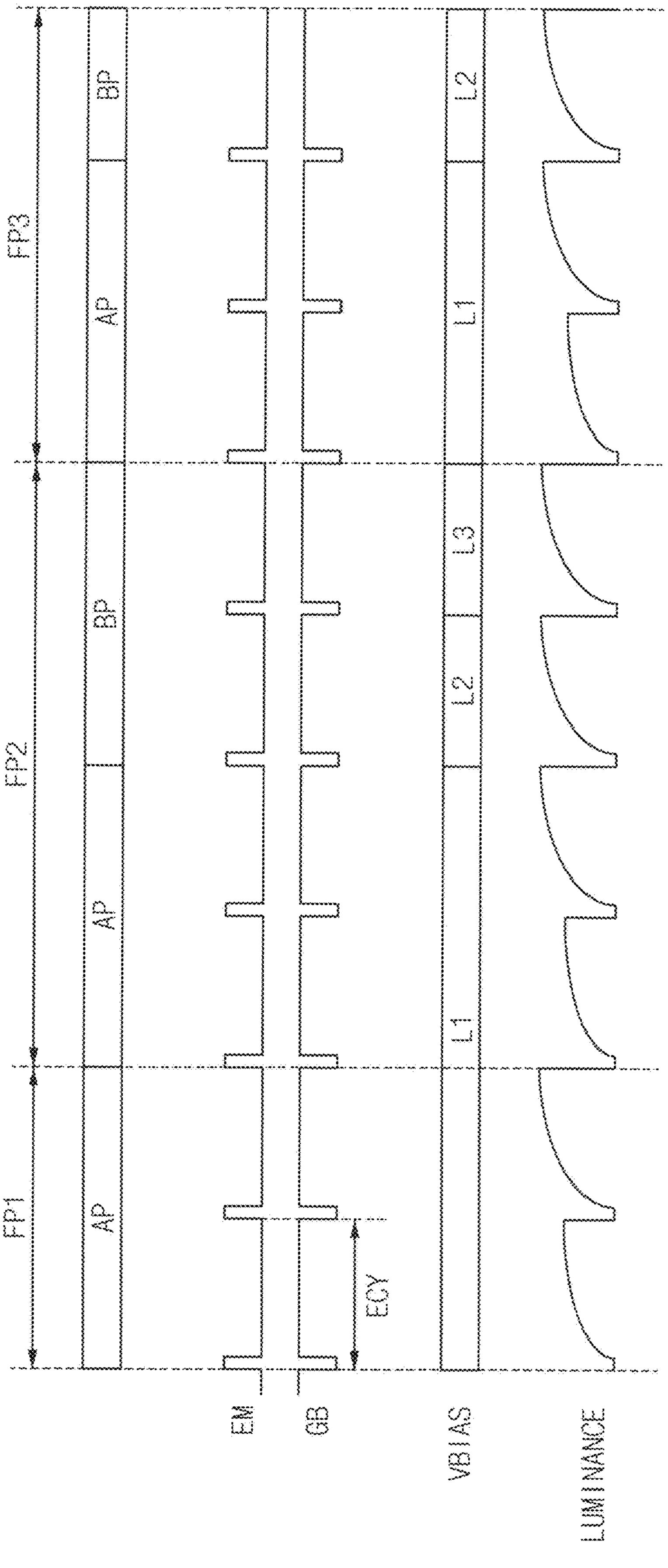
FIG. 7 is a diagram for describing a bias voltage and a luminance according to frame periods.

FIG. 7 is a diagram for describing the bias voltage VBIAS and a luminance according to the frame periods FP1, FP2, and FP3.

Referring to FIG. 7, the level of the bias voltage VBIAS may be constant in the active period AP. In the active period AP, the bias voltage VBIAS may have a first level L1. In the blank period BP, the level of the bias voltage VBIAS may be step-wisely changed. In the blank period BP, the level of the bias voltage VBIAS may be different from the first level L1.

In the blank period BP, the level of the bias voltage VBIAS may step-wisely increase. In the blank period BP, the level of the bias voltage VBIAS may step-wisely increase from the first level L1 to a second level L2 higher than the first level L1 and to a third level L3 higher than the second level L2. In an embodiment, for example, the first level L1 may be about 6.5 volts (V), the second level L2 may be about 6.7 V, and the third level L3 may be about 6.9 V.

The level of the bias voltage VBIAS may be step-wisely changed for each emission cycle ECY in the blank period BP. The level of the bias voltage VBIAS may increase from the first level L1 to the second level L2 at the start of the first emission cycle ECY within the blank period BP, and the level of the bias voltage VBIAS may increase from the second level L2 to the third level L3 at the start of the second emission cycle ECY within the blank period.

The blank period BP may increase as the driving frequency of the display panel 110 decreases, and the leakage current of the gate electrode of the first transistor T1 may increase as the blank period BP increases. When the leakage current of the gate electrode of the first transistor T1 increases, the luminance of the pixel PX may increase. In an embodiment, as described above, the level of the bias voltage VBIAS step-wisely increases in the blank period BP, such that the amount of compensation for the leakage current of the gate electrode of the first transistor T1 may increase. Accordingly, the luminance of the pixel PX may be effectively prevented from increasing as the driving frequency of the display panel 110 decreases.

Figure 8:
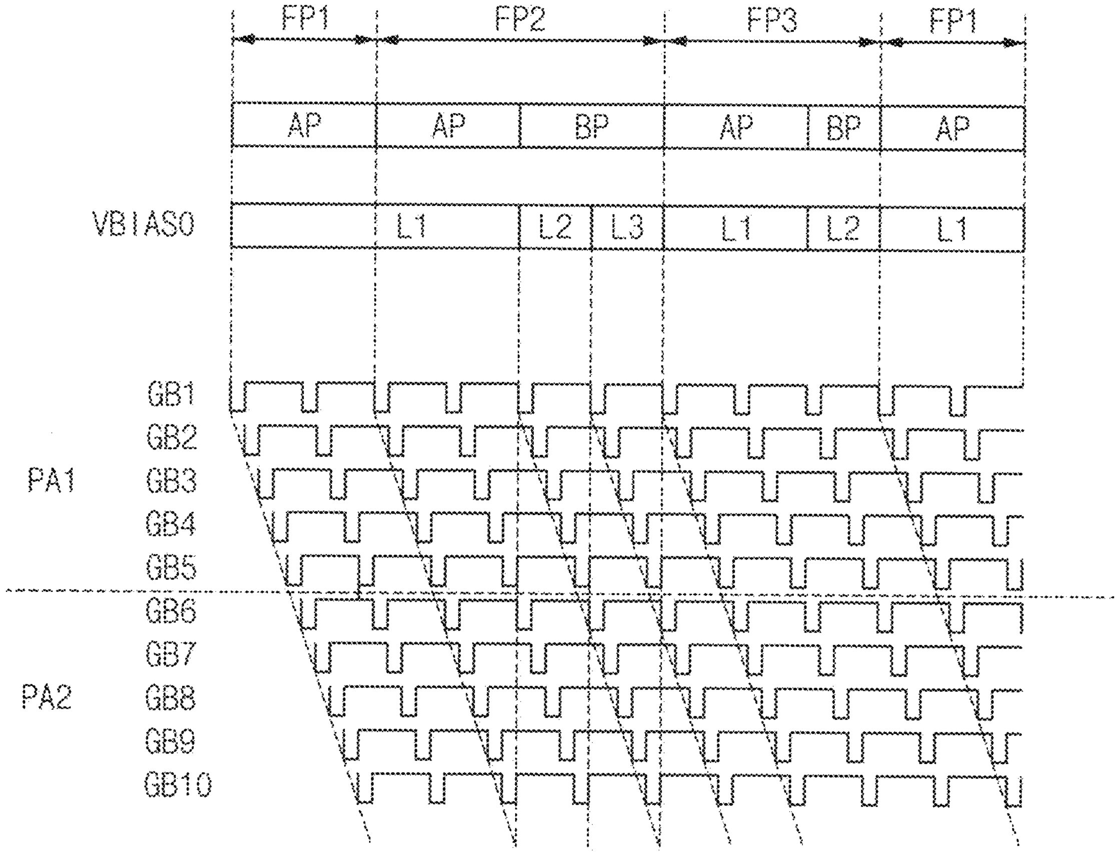
FIG. 8 is a diagram for describing a supply of a bias voltage according to a comparative example.

FIG. 8 is a diagram for describing a supply of the bias voltage VBIAS according to a comparative example.

Referring to FIG. 8, in a comparative example, one bias voltage VBIAS0 may be applied to the first and second pixel areas PA1 and PA2. In the comparative example, for example, the first pixel area PA1 may include first to fifth pixel rows, and the second pixel area PA2 may include sixth to tenth pixel rows.

As first to tenth bias gate signals GB1 to GB10, which are sequentially shifted, are applied to the first to tenth pixel rows, respectively, time points when the bias voltage VBIAS0 is applied to the first to tenth pixel rows may be sequentially shifted. In this case, in the second emission cycle ECY of the blank period BP of the second frame period FP2, the bias voltage VBIAS0 having the third level L3 may be provided to the first pixel area PA1, however, the bias voltage VBIAS0 having the first level L1 may be provided to the second pixel area PA2. Accordingly, the luminance of the pixels PX disposed in the second pixel area PA2 may increase, and the luminance deviation between the first pixel area PA1 and the second pixel area PA2 may increase.

Referring to FIGS. 1, 6, and 7, in embodiments, the power supply 152 may generate first to $n^{th}$ bias voltages VBIAS1 to VBIASn respectively provided to the first to $n^{th}$ pixel areas PA1 to PAn, and the timing controller 154 may control timings when the first to $n^{th}$ bias voltages VBIAS1 to VBIASn are provided to the first to $n^{th}$ pixel areas PA1 to PAn in a way such that a $k^{th}$ bias voltage is provided with a delay of one emission cycle ECY from a $(k-1)^{th}$ bias voltage (k is a natural number greater than or equal to 2 and less than or equal to n). The number of bias voltages VBIAS1 to VBIASn may be equal to the number of emission cycles ECY included in the active period AP.

The level of each of the first to $n^{th}$ bias voltages VBIAS1 to VBIASn may be constant in the active period AP. The level of each of the first to $n^{th}$ bias voltages VBIAS1 to VBIASn may be step-wisely changed in the blank period BP. In an embodiment, the level of each of the first to $n^{th}$ bias voltages VBIAS1 to VBIASn may step-wisely increase in the blank period BP. In an embodiment, the level of each of the first to $n^{th}$ bias voltages VBIAS1 to VBIASn may be step-wisely changed for each emission cycle ECY within the blank period BP.

In an embodiment, the level of the $k^{th}$ bias voltage may be equal to the level of the $(k-1)^{th}$ bias voltage. In such an embodiment, the $k^{th}$ bias voltage may be the same as a voltage in which the $(k-1)^{th}$ bias voltage is shifted by one emission cycle ECY.

In an embodiment, the level of the $k^{th}$ bias voltage may be different from the level of the $(k-1)^{th}$ bias voltage.

In an embodiment, the level of the $k^{th}$ bias voltage may be equal to the sum of the level of the first bias voltage and the offset level. When the power supply 152 is closest to the first pixel area PA1 among the first to $n^{th}$ pixel areas PA1 to PAn, the offset level may be greater than 0. When the power supply 152 is closest to the first pixel area PA1, voltage drop amounts of the second to $n^{th}$ bias voltages applied to the second to $n^{th}$ pixel areas may be greater than a voltage drop amount of the first bias voltage VBIAS1 applied to the first pixel area PA1. Accordingly, when the power supply 152 is closest to the first pixel area PA1, the levels of the second to $n^{th}$ bias voltages may be higher than the level of the first bias voltage VBIAS1, such that the voltage drop amounts of the second to $n^{th}$ bias voltages may be compensated.

Figure 9:
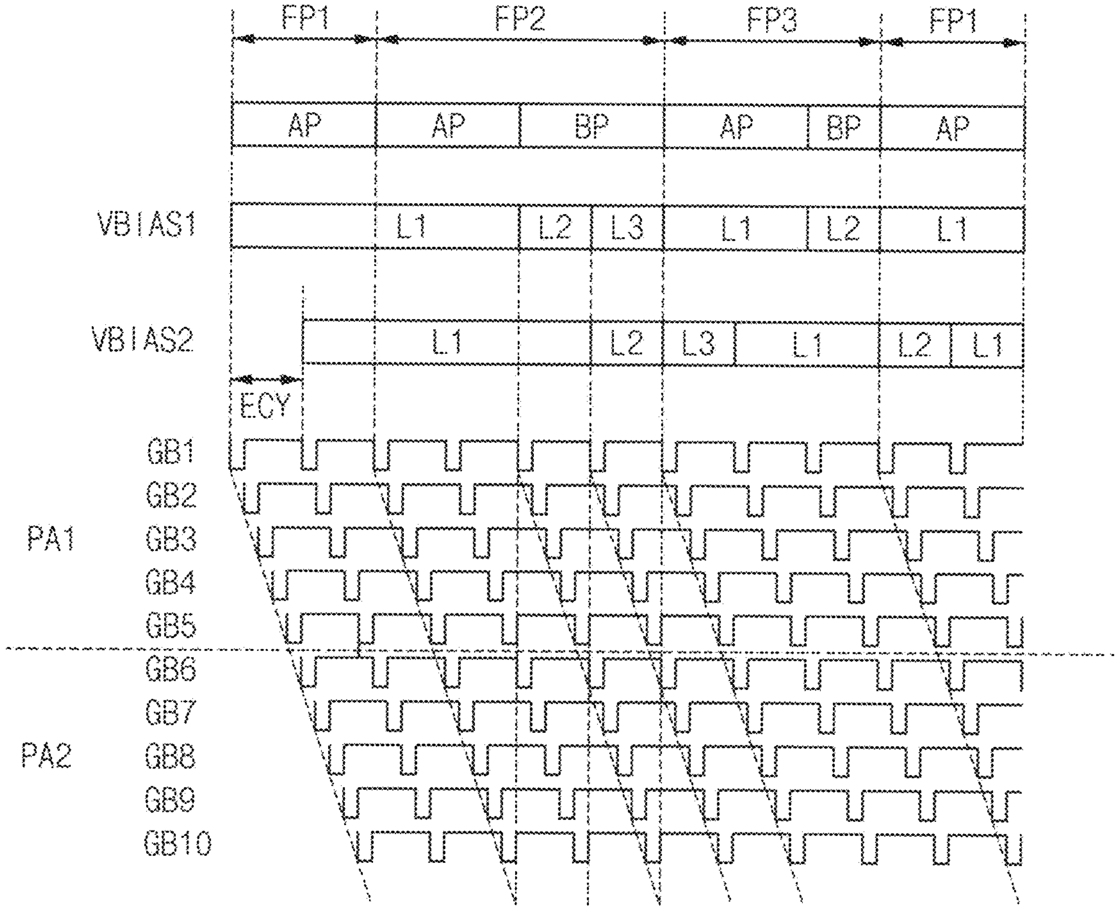
FIG. 9 is a diagram for describing a supply of first and second bias voltages according to an embodiment.

FIG. 9 is a diagram for describing a supply of first and second bias voltages VBIAS1 and VBIAS2 according to an embodiment.

Referring to FIG. 9, in an embodiment, the power supply 152 may generate first and second bias voltages VBIAS1 and VBIAS2 respectively provided to the first and second pixel areas PA1 and PA2, and the timing controller 154 may control timings when the first and second bias voltages VBIAS1 and VBIAS2 are provided to the first and second pixel areas PA1 and PA2 in a way such that the second bias voltage VBIAS2 is provided with a delay of one emission cycle ECY from the first bias voltage VBIAS1. In an embodiment where the number of emission cycles ECY included in the active period AP is two, the power supply 152 may generate two bias voltages VBIAS1 and VBIAS2.

In the active period AP, the level of each of the first and second bias voltages VBIAS1 and VBIAS2 may be constant. In the active period AP, each of the first and second bias voltages VBIAS1 and VBIAS2 may have the first level L1. In the blank period BP, the level of each of the first and second bias voltages VBIAS1 and VBIAS2 may step-wisely increase. The level of each of the first and second bias voltages VBIAS1 and VBIAS2 may increase from the first level L1 to the second level L2 at the start of the first emission cycle within the blank period BP, and the level of each of the first and second bias voltages VBIAS1 and VBIAS2 may increase from the second level L2 to the third level L3 at the start of the second emission cycle within the blank period BP.

In an embodiment, the level of the second bias voltage VBIAS2 may be equal to the level of the first bias voltage VBIAS1. In such an embodiment, the second bias voltage VBIAS2 may be the same as a voltage in which the first bias voltage VBIAS1 is shifted by one emission cycle ECY.

Figure 10:
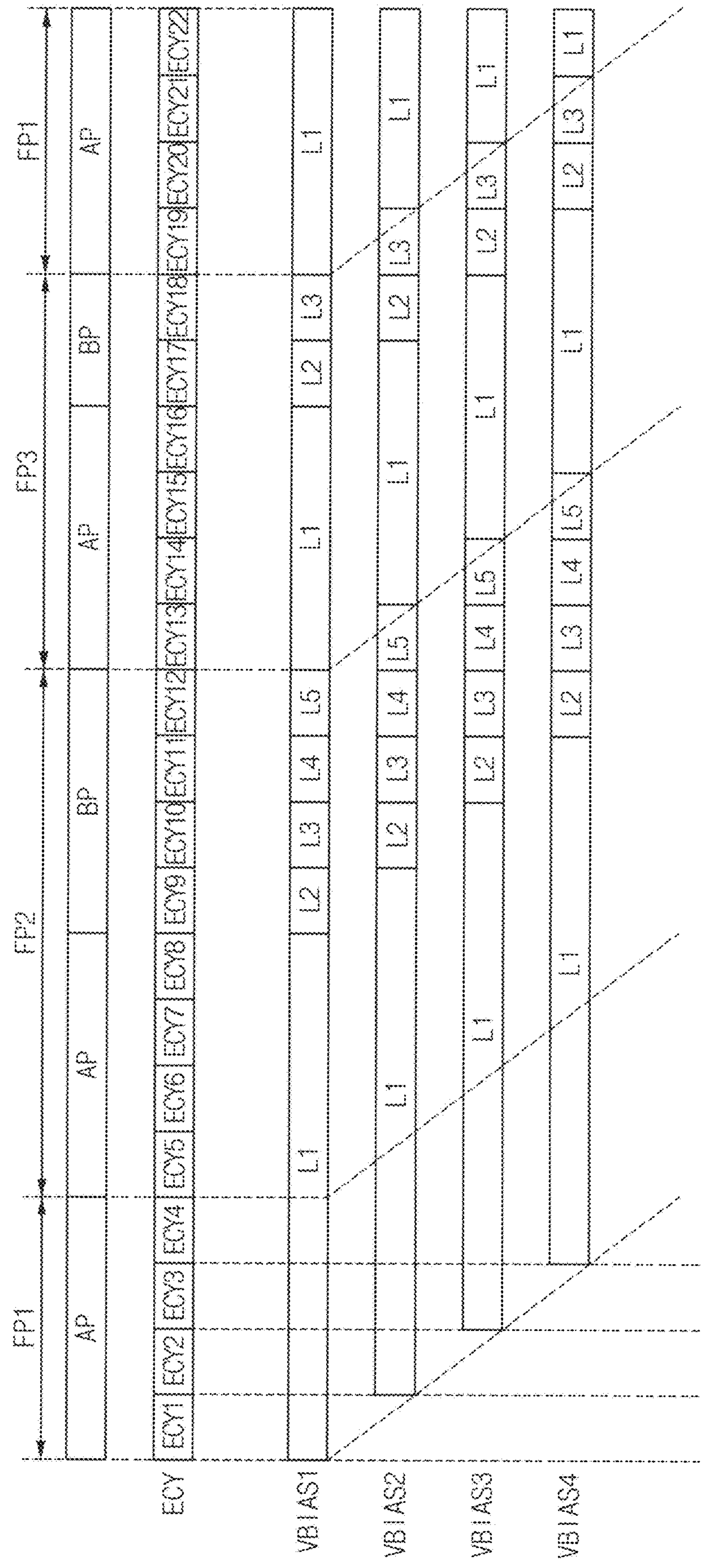
FIG. 10 is a diagram for describing a supply of first to fourth bias voltages according to an embodiment.

FIG. 10 is a diagram for describing a supply of first to fourth bias voltages VBIAS1 to VBIAS4 according to an embodiment.

Referring to FIG. 10, in an embodiment, the power supply 152 may generate first to fourth bias voltages VBIAS1 to VBIAS4 respectively provided to the first to fourth pixel areas, and the timing controller 154 may control timings when the first to fourth bias voltages VBIAS1 to VBIAS4 are provided to the first to fourth pixel areas in way such that the second bias voltage VBIAS2 is provided with a delay of one emission cycle ECY from the first bias voltage VBIAS1, the third bias voltage VBIAS3 is provided with a delay of one emission cycle ECY from the second bias voltage VBIAS2, and the fourth bias voltage VBIAS4 is provided with a delay of one emission cycle ECY from the third bias voltage VBIAS3. In an embodiment where the number of emission cycles ECY included in the active period AP is four, the power supply 152 may generate four bias voltages VBIAS1, VBIAS2, VBIAS3, and VBIAS4.

The level of each of the first to fourth bias voltages VBIAS1 to VBIAS4 may be constant in the active period AP. In the active period AP, each of the first to fourth bias voltages VBIAS1 to VBIAS4 may have the first level L1. In the blank period BP, the level of each of the first to fourth bias voltages VBIAS1 to VBIAS4 may step-wisely increase. The level of each of the first to fourth bias voltages VBIAS1 to VBIAS4 may increase from the first level L1 to the second level L2 at the start of the first emission cycle ECY9 and ECY17 within the blank period BP, the level of each of the first to fourth bias voltages VBIAS1 to VBIAS4 may increase from the second level L2 to the third level L3 at the start of the second emission cycle ECY10 and ECY18 within the blank period BP, the level of each of the first to fourth bias voltages VBIAS1 to VBIAS4 may increase from the third level L3 to the fourth level L4 at the start time of the third emission cycle ECY11 within the blank period BP, and the level of each of the first to fourth bias voltages VBIAS1 to VBIAS4 may increase from the fourth level L4 to the fifth level L5 at the start time of the fourth emission cycle ECY12 within the blank period BP. In an embodiment, for example, the first level L1 may be about 6.5 V, the second level L2 may be about 6.6 V, the third level L3 may be about 6.7 V, the fourth level L4 may be about 6.8 V, and the fifth level L5 may be about 6.9 V.

In an embodiment, the level of the first bias voltage VBIAS1, the level of the second bias voltage VBIAS2, the level of the third bias voltage VBIAS3, and the level of the fourth bias voltage VBIAS4 may be equal to each other. In such an embodiment, the second bias voltage VBIAS2 may be the same as a voltage at which the first bias voltage VBIAS1 is shifted by one emission cycle ECY, the third bias voltage VBIAS3 may be the same as a voltage at which the first bias voltage VBIAS1 is shifted by the two emission cycles ECY, and the fourth bias voltage VBIAS4 may be the same as a voltage at which the first bias voltage VBIAS1 is shifted by three emission cycles ECY.

Figure 11:
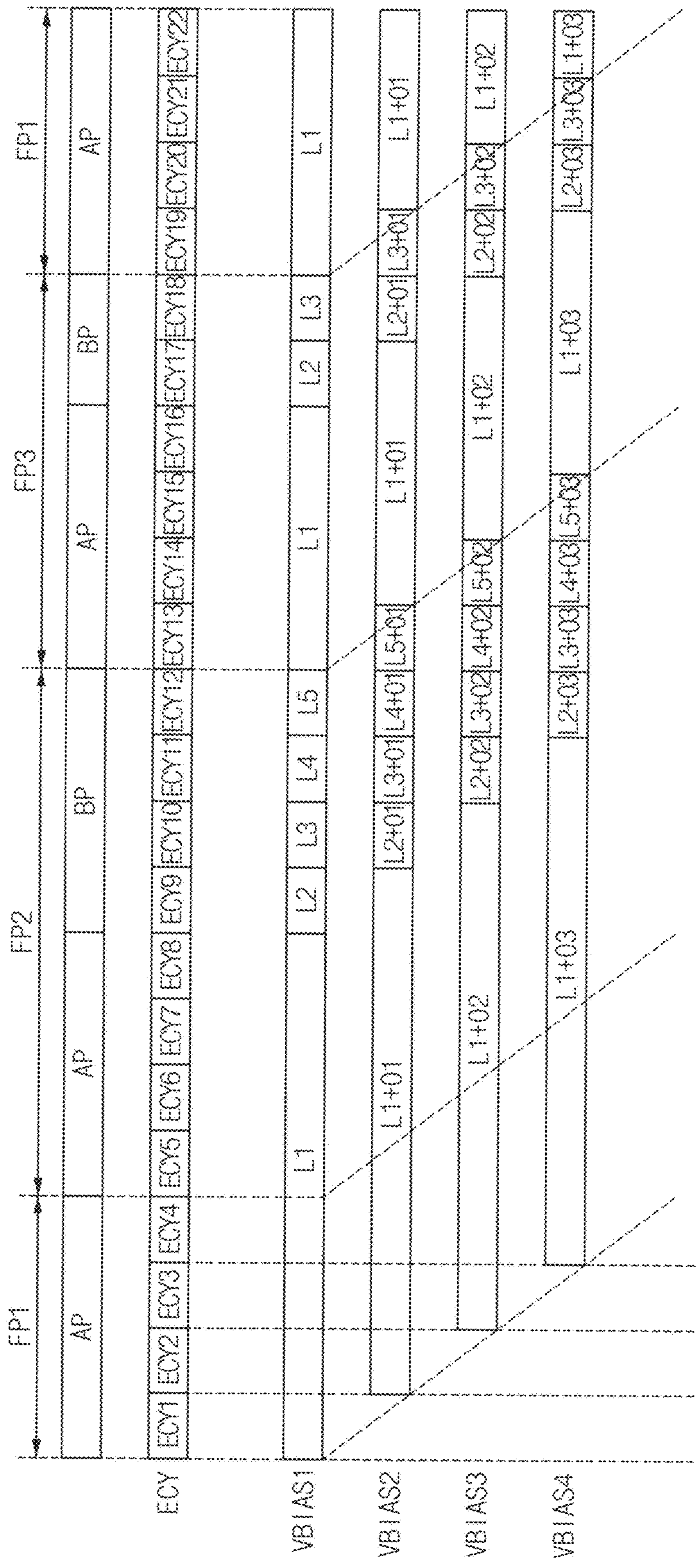
FIG. 11 is a diagram for describing a supply of first to fourth bias voltages according to an alternative embodiment.

FIG. 11 is a diagram for describing a supply of first to fourth bias voltages VBIAS1 to VBIAS4 according to an alternative embodiment.

Referring to FIG. 11, in an embodiment, the level of the second bias voltage VBIAS2 may be equal to the sum of the level of the first bias voltage VBIAS1 and a first offset level O1, the level of the third bias voltage VBIAS3 may be equal to the sum of the level of the first bias voltage VBIAS1 and a second offset level O2, and the level of the fourth bias voltage VBIAS4 may be equal to the sum of the level of the first bias voltage VBIAS1 and a third offset levels O3.

In an embodiment where the power supply 152 is closest to the first pixel area PA1 among the first to fourth pixel areas, the first to third offset levels O1 to O3 may be greater than 0. In an embodiment where the power supply 152 is closest to the first pixel area PA1, voltage drop amounts of the second to fourth bias voltages VBIAS2 to VBIAS4 applied to the second to fourth pixel areas may be greater than a voltage drop amount of the first bias voltage VBIAS1 applied to the first pixel area PA1. Accordingly, when the power supply 152 is closest to the first pixel area PA1, the levels of the second to fourth bias voltages VBIAS2 to VBIAS4 may be higher than the level of the first bias voltage VBIAS1, so that the voltage drop amounts of the second to fourth bias voltages VBIAS2 to VBIAS4 may be compensated.

Since the first to fourth pixel areas are arranged in one direction, in an embodiment where the power supply 152 is closest to the first pixel area PA1 among the first to fourth pixel areas, the voltage drop amount of the third bias voltage VBIAS3 applied to the third pixel area may be greater than the voltage drop amount of the second bias voltage VBIAS2 applied to the second pixel area, and the voltage drop amount of the fourth bias voltage VBIAS4 applied to the fourth pixel area may be greater than the voltage drop amount of the third bias voltage VBIAS3 applied to the third pixel area. Accordingly, the second offset level O2 may be higher than the first offset level O1, and the third offset level O3 may be higher than the second offset level O2.

Figure 12:
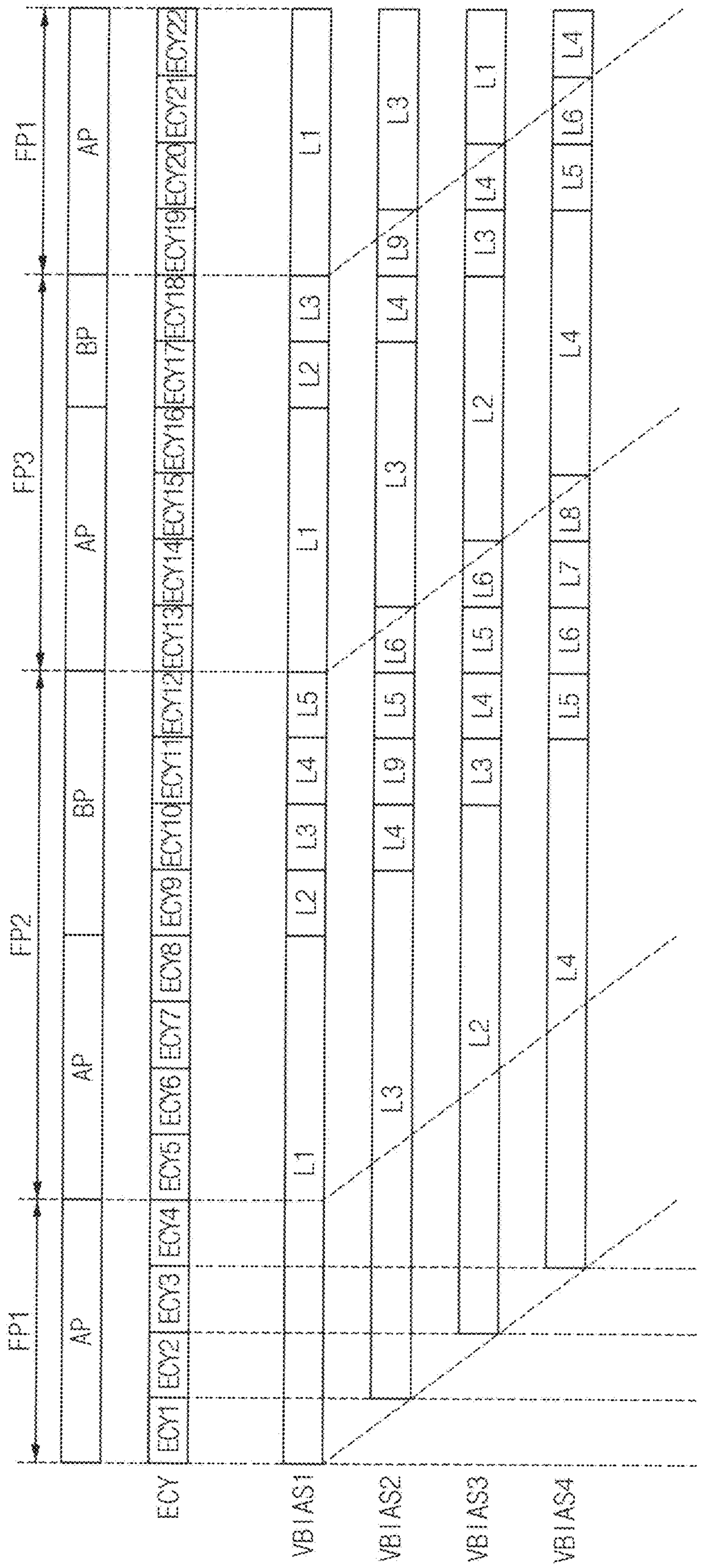
FIG. 12 is a diagram for describing a supply of first to fourth bias voltages according to an alternative embodiment.

FIG. 12 is a diagram for describing a supply of first to fourth bias voltages VBIAS1 to VBIAS4 according to an alternative embodiment.

Referring to FIG. 12, in an embodiment, the level of the first bias voltage VBIAS1, the level of the second bias voltage VBIAS2, the level of the third bias voltage VBIAS3, and the level of the fourth bias voltage VBIAS4 may be different from each other. The level of the first bias voltage VBIAS1, the level of the second bias voltage VBIAS2, the level of the third bias voltage VBIAS3, and the level of the fourth bias voltage VBIAS4 may be determined in consideration of voltage drop amounts of the first to fourth bias voltages VBIAS1 to VBIAS4 based on the positions of the first to fourth pixel areas, characteristic deviations of the first to fourth pixel areas, or the like. In an embodiment, for example, a first level L1 may be about 6.5V, a second level L2 may be about 6.6 V, a third level L3 may be about 6.7 V, a fourth level L4 may be about 6.8 V, a fifth level L5 may be about 6.9 V, a sixth level L6 may be about 7 V, a seventh level L7 may be about 7.1 V, an eighth level L8 may be about 7.2 V, and a ninth level L9 may be about 6.85 V.

The display device according to embodiments described herein may be applied to a display device included in any electric device, such as a computer, a notebook, a mobile phone, a smart phone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel which includes first to $n^{th}$ pixel areas arranged in a direction, wherein n is a natural number greater than or equal to 2;

an emission control driver which provides an emission control signal having a plurality of emission cycles corresponding to a number of outputs of a gate-on voltage during a frame period to the first to $n^{th}$ pixel areas;

a power supply which generates first to $n^{th}$ bias voltages respectively provided to the first to $n^{th}$ pixel areas; and a timing controller which controls timings when the first to $n^{th}$ bias voltages are supplied to the first to $n^{th}$ pixel areas in a way such that a $k^{th}$ bias voltage is provided with a delay of one emission cycle from a $(k-1)^{th}$ bias voltage, wherein k is a natural number greater than or equal 2 and less than or equal n, wherein the frame period includes an active period and a blank period following the active period, wherein a number of the emission cycles included in the active period is n, and wherein a level of each of the first to $n^{th}$ bias voltages is step-wisely changed in the blank period, wherein each of the adjacent bias voltages is incrementally changed by a uniform amount.

2. The display device of claim 1, wherein the level of each of the first to $n^{th}$ bias voltages is step-wisely changed for the emission cycle within the blank period.

3. The display device of claim 1, wherein the level of each of the first to $n^{th}$ bias voltages step-wisely increases in the blank period.

4. The display device of claim 1, wherein a number of the emission cycles included in the blank period increases as a driving frequency of the display panel decreases.

5. The display device of claim 1, wherein a level of each of the first to $n^{th}$ bias voltages is constant in the active period.

6. The display device of claim 1, wherein a level of the $k^{th}$ bias voltage is equal to a level of the $(k-1)^{th}$ bias voltage.

7. The display device of claim 1, wherein a level of the $k^{th}$ bias voltage is different from a level of the $(k-1)^{th}$ bias voltage.

8. The display device of claim 7, wherein the level of the $k^{th}$ bias voltage is equal to a sum of a level of the first bias voltage and an offset level.

9. The display device of claim 8, wherein the power supply is closest to the first pixel area among the first to $n^{th}$ pixel areas, and wherein the offset level is greater than 0.

10. The display device of claim 1, further comprising:

a gate driver which provides a bias gate signal having a frequency equal to a frequency of the emission control signal to the first to $n^{th}$ pixel areas.

11. The display device of claim 10, wherein each of the first to $n^{th}$ pixel areas includes a plurality of pixels, and wherein each of the pixels includes:

a light emitting diode;

a driving transistor which provides a driving current to the light emitting diode; and a bias transistor which provides a corresponding bias voltage among the first to $n^{th}$ bias voltages to a source electrode or a drain electrode of the driving transistor in response to the bias gate signal.

12. The display device of claim 1, wherein n is greater than or equal to 4.

13. A driver for driving a display panel including first to $n^{th}$ pixel areas arranged in a direction, wherein an emission control signal having a plurality of emission cycles corresponding to a number of outputs of a gate-on voltage during a frame period is provided to the first to $n^{th}$ pixel areas, and first to $n^{th}$ bias voltages are respectively provided to the first to $n^{th}$ pixel areas, wherein n is a natural number greater than or equal to 2, wherein the driver controls timings when the first to $n^{th}$ bias voltages are supplied to the first to $n^{th}$ pixel areas in a way such that a $k^{th}$ bias voltage is provided with a delay of one emission cycle from a $(k-1)^{th}$ bias voltage, wherein k is a natural number greater than or equal 2 and less than or equal n, wherein the frame period includes an active period and a blank period following the active period, wherein a number of the emission cycles included in the active period is n, and wherein a level of each of the first to $n^{th}$ bias voltages is step-wisely changed in the blank period, wherein each of the adjacent bias voltages is incrementally changed by a uniform amount.

14. The driver of claim 13, comprising:

a power supply which generates the first to $n^{th}$ bias voltages; and a timing controller which controls the timings when the first to $n^{th}$ bias voltages are supplied to the first to $n^{th}$ pixel areas in a way such that the $k^{th}$ bias voltage is provided with the delay of one emission cycle from the $(k-1)^{th}$ bias voltage.

15. The driver of claim 13, wherein the level of each of the first to $n^{th}$ bias voltages is step-wisely changed for the emission cycle within the blank period.

16. The driver of claim 13, wherein a level of the $k^{th}$ bias voltage is equal to a level of the $(k-1)^{th}$ bias voltage.

17. The driver of claim 13, wherein a level of the $k^{th}$ bias voltage is different from a level of the $(k-1)^{th}$ bias voltage.

18. The driver of claim 13, wherein n is greater than or equal to 4.

* * * * *